US009319544B2

(12) United States Patent
Suzuki

(10) Patent No.: US 9,319,544 B2
(45) Date of Patent: Apr. 19, 2016

(54) IMAGE READING APPARATUS

(71) Applicant: Hirofumi Suzuki, Kiyosu (JP)

(72) Inventor: Hirofumi Suzuki, Kiyosu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/945,539

(22) Filed: Jul. 18, 2013

(65) Prior Publication Data
US 2014/0023416 A1 Jan. 23, 2014

(30) Foreign Application Priority Data
Jul. 20, 2012 (JP) .................................. 2012-161151

(51) Int. Cl.
G03G 21/16 (2006.01)
H04N 1/00 (2006.01)

(52) U.S. Cl.
CPC ....... H04N 1/00554 (2013.01); H04N 1/00557 (2013.01); *H04N 2201/0081* (2013.01)

(58) Field of Classification Search
CPC .................................................. H04N 1/00554
USPC .................................................. 399/367, 380
See application file for complete search history.

(56) References Cited

U.S. PATENT DOCUMENTS

| 5,517,332 | A * | 5/1996 | Barry et al. ................... 358/496 |
| 6,347,213 | B1 | 2/2002 | Yamanaka et al. |
| 6,603,950 | B2 | 8/2003 | Hamada et al. |
| 8,246,035 | B2 | 8/2012 | Ito |
| 8,373,911 | B2 | 2/2013 | Iwata et al. |
| 2002/0067939 | A1 | 6/2002 | Hamada et al. |
| 2002/0164197 | A1 * | 11/2002 | Lee .......................... E05D 3/022 403/65 |
| 2003/0179390 | A1 * | 9/2003 | Kitozaki ....................... 358/1.6 |
| 2007/0120906 | A1 * | 5/2007 | Umeda ................ B41J 2/17509 347/86 |
| 2009/0190988 | A1 * | 7/2009 | Vereecken ............. B41J 3/4075 400/208 |
| 2010/0102500 | A1 | 4/2010 | Ito |
| 2011/0148034 | A1 * | 6/2011 | Inoue ............................ 271/264 |
| 2011/0235082 | A1 | 9/2011 | Mukai |
| 2012/0050826 | A1 | 3/2012 | Iwata et al. |

FOREIGN PATENT DOCUMENTS

| JP | 2000-233874 A | 8/2000 |
| JP | 2001-313757 A | 11/2001 |
| JP | 2002-165061 A | 6/2002 |
| JP | 2003-051906 A | 2/2003 |

(Continued)

*Primary Examiner* — Blake A Tankersley
*Assistant Examiner* — Ruben Parco, Jr.
(74) *Attorney, Agent, or Firm* — Banner & Witcoff, Ltd.

(57) ABSTRACT

An image reading apparatus, including a main unit including a placement plane and an image reader, a document cover swingably supported by the main unit via a hinge to move between a closed position and an open position, and a conveyer unit to convey a document sheet, is provided. The hinge includes an in-main-unit joint section attached to an end of the main unit, an on-cover joint section attached to an end of the document cover, and an urging member arranged in between the in-main-unit joint section and the on-cover joint section. A coupling device to couple the end of the document cover and the end of the main unit together and to restrict the end of the document cover and the end of the main unit from being separated from each other is disposed in an intermediate position between the document cover and the conveyer unit.

6 Claims, 10 Drawing Sheets

(56) References Cited

FOREIGN PATENT DOCUMENTS

| JP | 2003-228141 A | 8/2003 |
| JP | 2004-304269 A | 10/2004 |
| JP | 2005-022805 A | 1/2005 |
| JP | 2006-262223 A | 9/2006 |
| JP | 2010-109573 A | 5/2010 |
| JP | 2011-205334 A | 10/2011 |
| JP | 2012-049940 A | 3/2012 |

* cited by examiner

IMAGE READING APPARATUS

CROSS REFERENCE TO RELATED APPLICATION

This application claims priority from Japanese Patent Application No. 2012-161151, filed on Jul. 20, 2012, the entire subject matter of which is incorporated herein by reference.

BACKGROUND

1. Technical Field

An aspect of the present invention relates to an image reading apparatus.

2. Related Art

An image reading apparatus having a main unit, a document cover, and a conveyer unit is known. The main unit may include a document placement unit having a placement plane, on which a sheet of original document to be read can be placed, and an image reader to read an image formed on the original document placed on the placement plane.

The document cover may be made of resin and coupled to the main unit via hinges to be swingable about a swing axis, which extends in parallel with a predetermined first direction. The document cover may be swingable between a closed position, in which the document cover covers the document placement unit in the main unit, and an open position, in which the document placement unit is exposed.

The conveyer unit may be arranged on one end of the document cover along a second direction, which is orthogonal to the placement plane. The conveyer unit may include a document tray, in which the original documents can be placed. The conveyer unit may convey the original documents placed in the document tray while the images formed on the original documents being conveyed are read by the image reader.

The hinge coupling the document cover to the main unit may include an in-main-unit joint section, an on-cover joint section, and an urging member. The in-main-unit joint section may be attached to an end portion of the main unit on one side along a third direction, which is orthogonal to the first direction and to the second direction. The on-cover joint section may be attached to an end part of the document cover on the one side along the third direction. The urging member may be arranged in between the in-main unit joint section and the on-cover joint section and may apply urging force to maintain an open posture of the document cover being in the open position.

Meanwhile, the document cover in the open posture is cantilevered by the on-cover joint section at one end along the third direction alone to hold the other end in the air. While the conveyer unit having substantial weight is arranged on the document cover, the other end of the document cover along the third direction may tend to deform downward by the weight. Therefore, when torque by the urging member of the hinge is applied to the document cover in the open posture, reaction force may be produced in an area around the end part of the document cover where the on-cover joint section is attached to.

In consideration of the reaction force, the image reading apparatus may be equipped with an L-shaped metal frame in the conveyer unit. The L-shaped metal frame may be attached along with the on-cover joint section to the end part of the document cover along the third direction. The L-shaped metal frame thereat may enhance the area surrounding the end part of the document cover so that the reaction force should be borne by the L-shaped metal frame. Thus, durability of the document cover may be improved.

SUMMARY

The L-shaped metal frame may be, however, omitted occasionally in order to lower manufacturing cost. When the L-shaped metal frame is omitted, naturally, the durability of the document cover may be lowered. Therefore, when the torque by the urging member of the hinge is applied to the document cover in the open posture, the reaction force produced in the document cover may concentrate in the area around the end part of the document cover where the on-cover joint section is attached to. With the concentrated force, the document cover may be exhausted or damaged while the document cover is repeatedly opened and closed over a long period of time. Accordingly, the image forming apparatus may not be durable over a longer period of time.

In view of the above conditions, the present invention is advantageous in that an image reading apparatus, in which the manufacturing cost can be lowered and the durability of the document cover is improved, is provided.

According to an aspect of the present invention, an image reading apparatus is provided. The image reading apparatus includes a main unit comprising a placement plane, on which a document sheet to be read is placed, and an image reader, which is configured to read an image formed on the document sheet placed on the placement plane; a document cover made of resin and configured to be swingably supported by the main unit via a hinge to swing about a swing axis, which is in parallel with a first direction, and to be movable between a closed position to cover the placement plane and an open position to expose the placement plane; and a conveyer unit arranged on one side of the document cover along a second direction which is orthogonal with respect to the placement plane, the conveyer unit comprising a document tray, which is configured to accommodate the document sheet to be read therein, the conveyer unit being configured to convey the document sheet from the document tray to have the image formed thereon to be read by the image reader. The hinge includes an in-main-unit joint section, which is configured to be attached to an end of the main unit on one side along a third direction being orthogonal with respect to the first direction and to the second direction; an on-cover joint section, which is configured to be attached to an end of the document cover on the one side along the third direction; and an urging member arranged in between the in-main-unit joint section and the on-cover joint section and configured to provide urging force to maintain the document cover in the open position. A coupling device, configured to couple the end of the document cover on the one side along the third direction and the end of the main unit on the one side along the third direction together, and to restrict the end of the document cover and the end of the main unit from being separated from each other along an orthogonal direction being orthogonal with respect to the first direction, is disposed in an intermediate position between the document cover and the conveyer unit.

BRIEF DESCRIPTION OF THE ACCOMPANYING DRAWINGS

Figure 3:
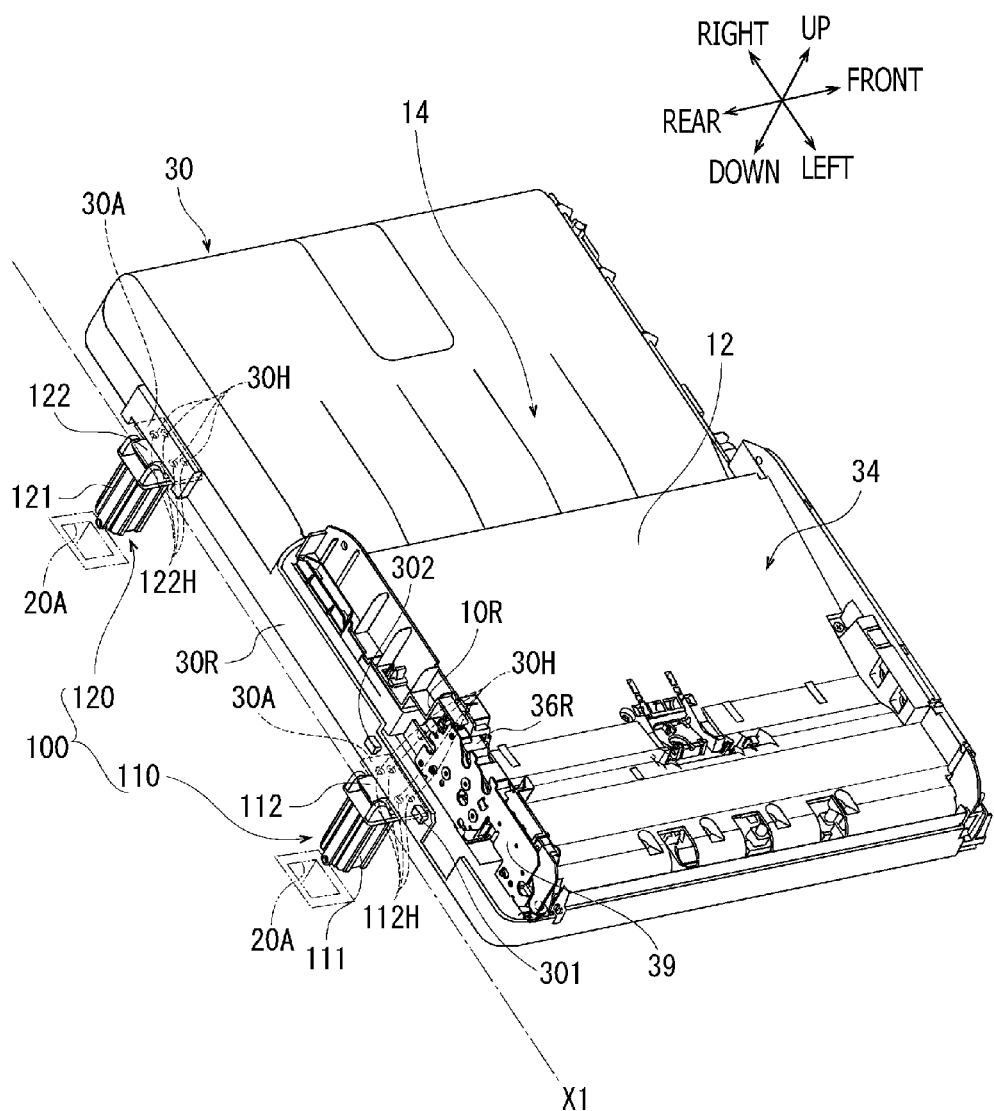

FIG. 3 is a perspective view of the upper part of the image reading apparatus 10, including a document cover 30, an upper chute 34, a main hinge 110, and an auxiliary hinge 120, according to the embodiment of the present invention.

Figure 4:
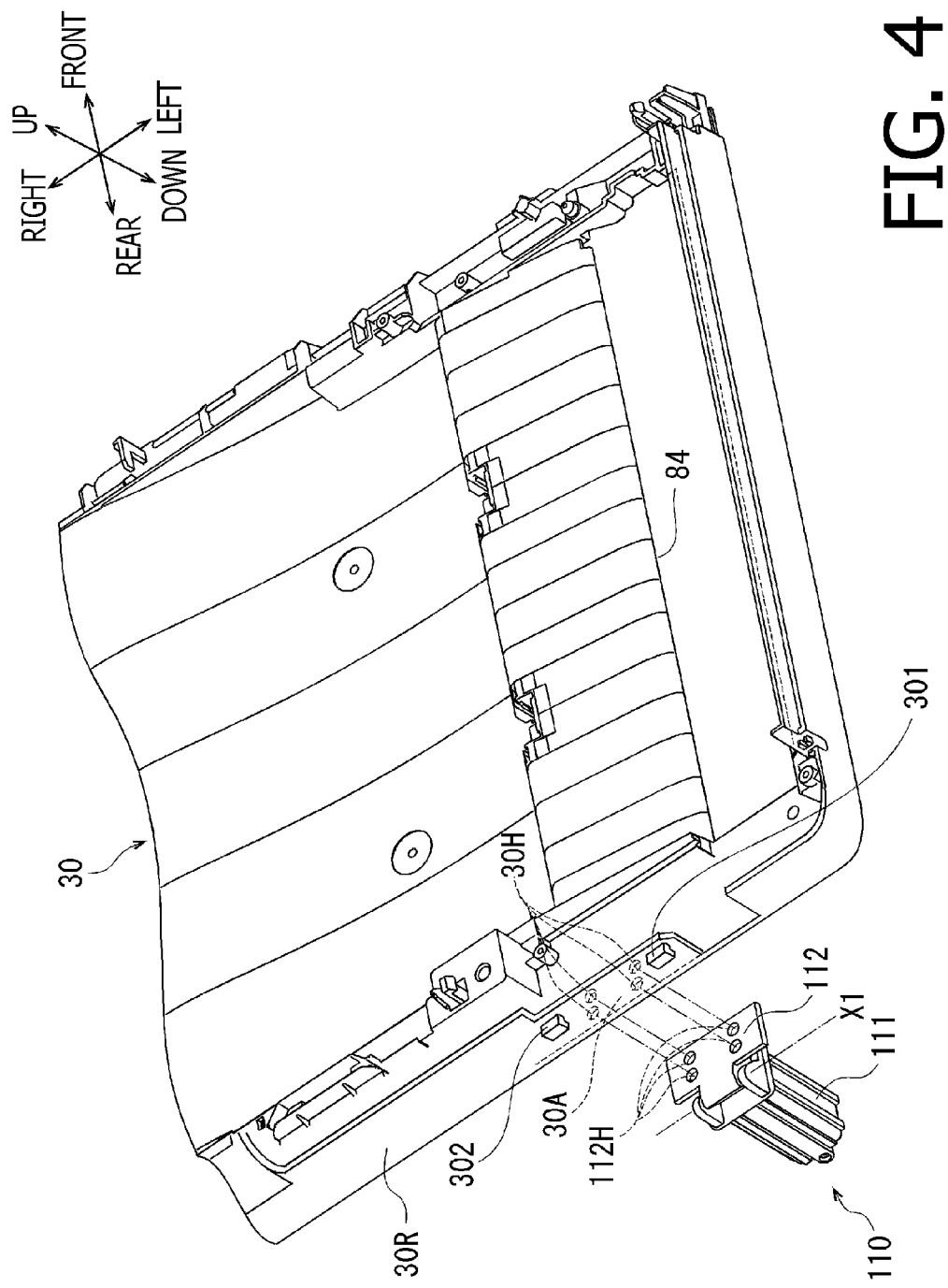

FIG. 4 is a perspective partial view of the document cover 30 and the main hinge 110 in the image reading apparatus 10 according to the embodiment of the present invention.

Figure 5:
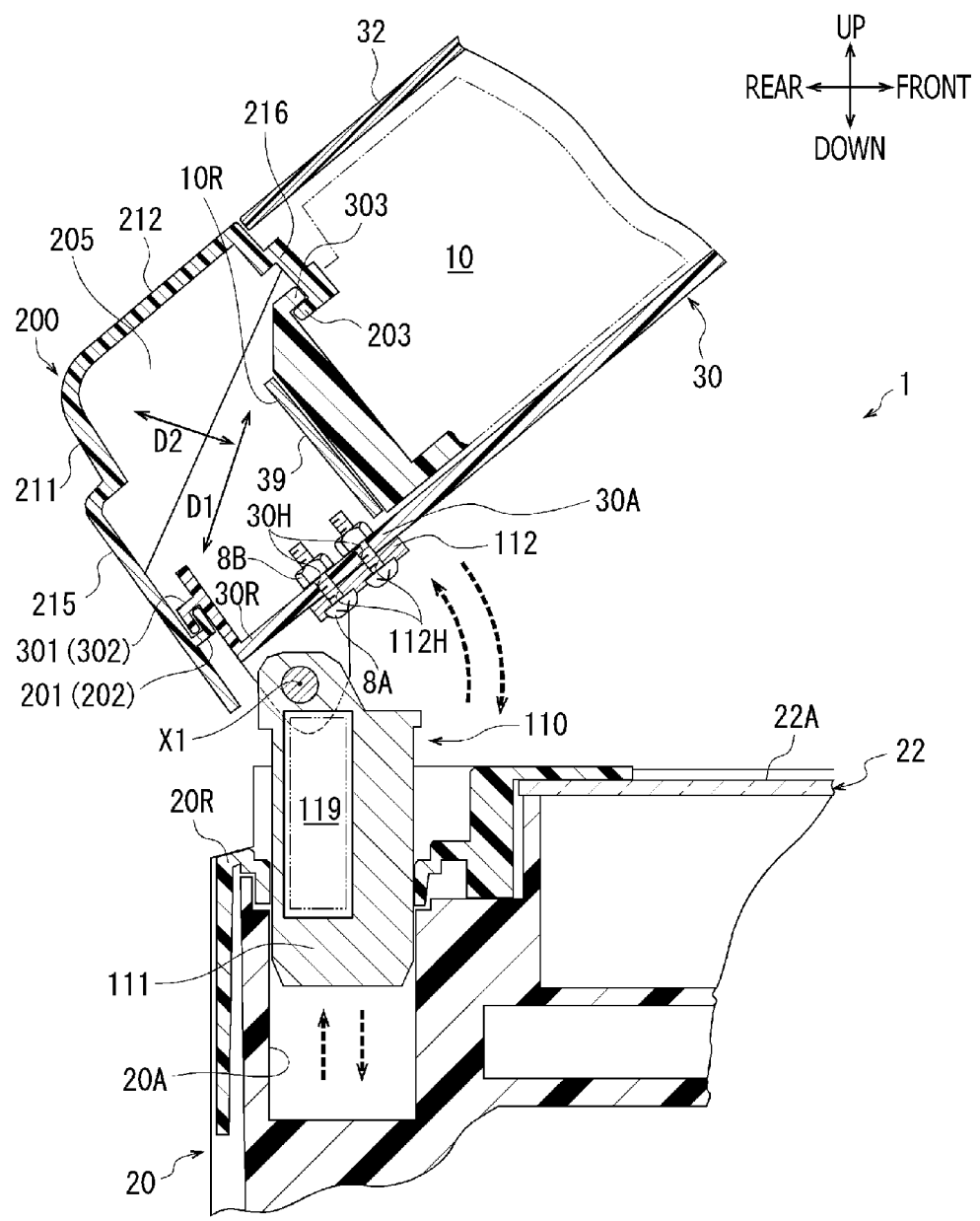

FIG. 5 is a cross-sectional partial view of the document cover 30 and the main hinge 110 to illustrate opening and closing motions of the document cover 30 in the image reading apparatus 10 according to the embodiment of the present invention.

Figure 6:
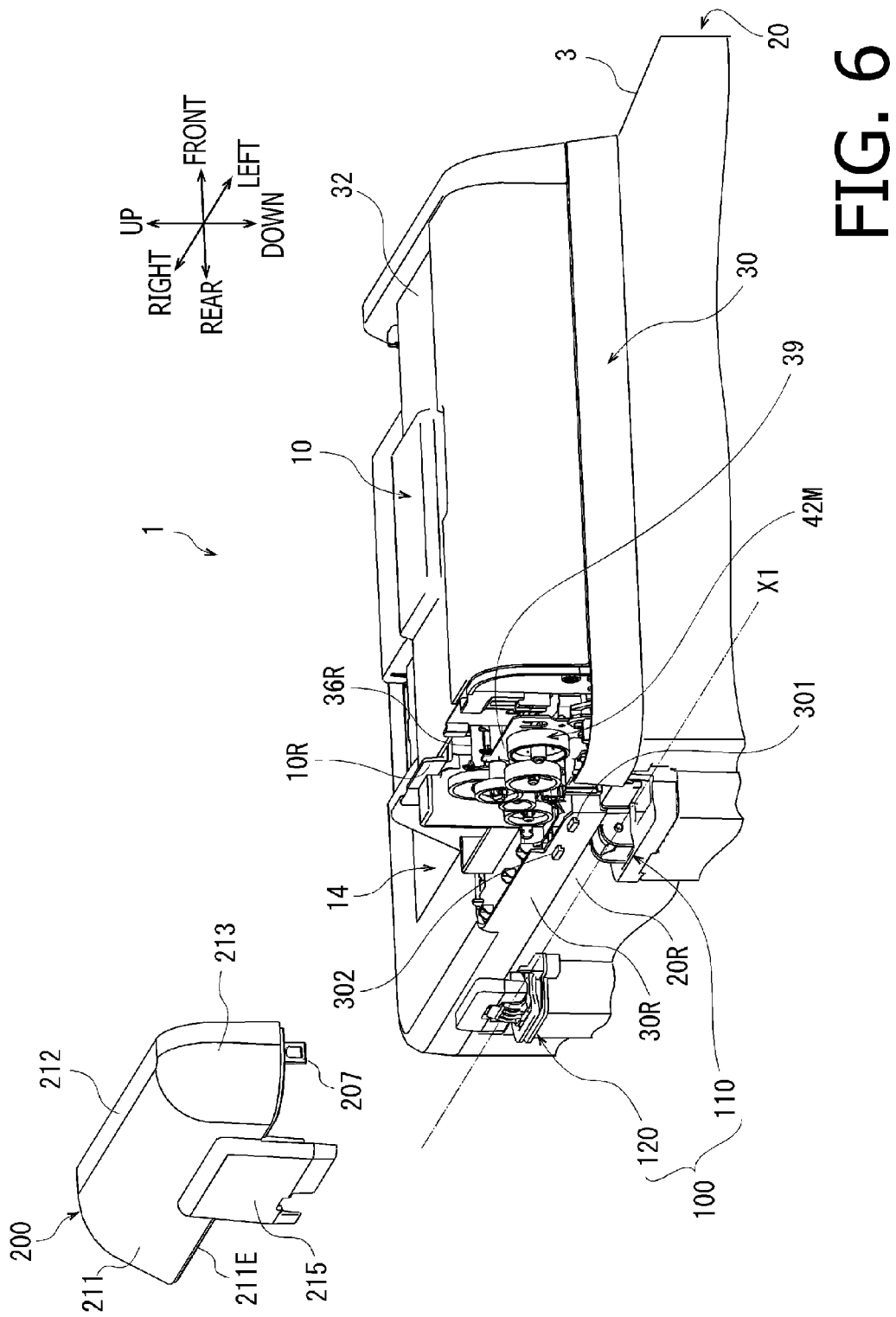

FIG. 6 is a perspective rear view of the upper part of the image reading apparatus 10, with an unattached rear cover 200, according to the embodiment of the present invention.

Figure 7:
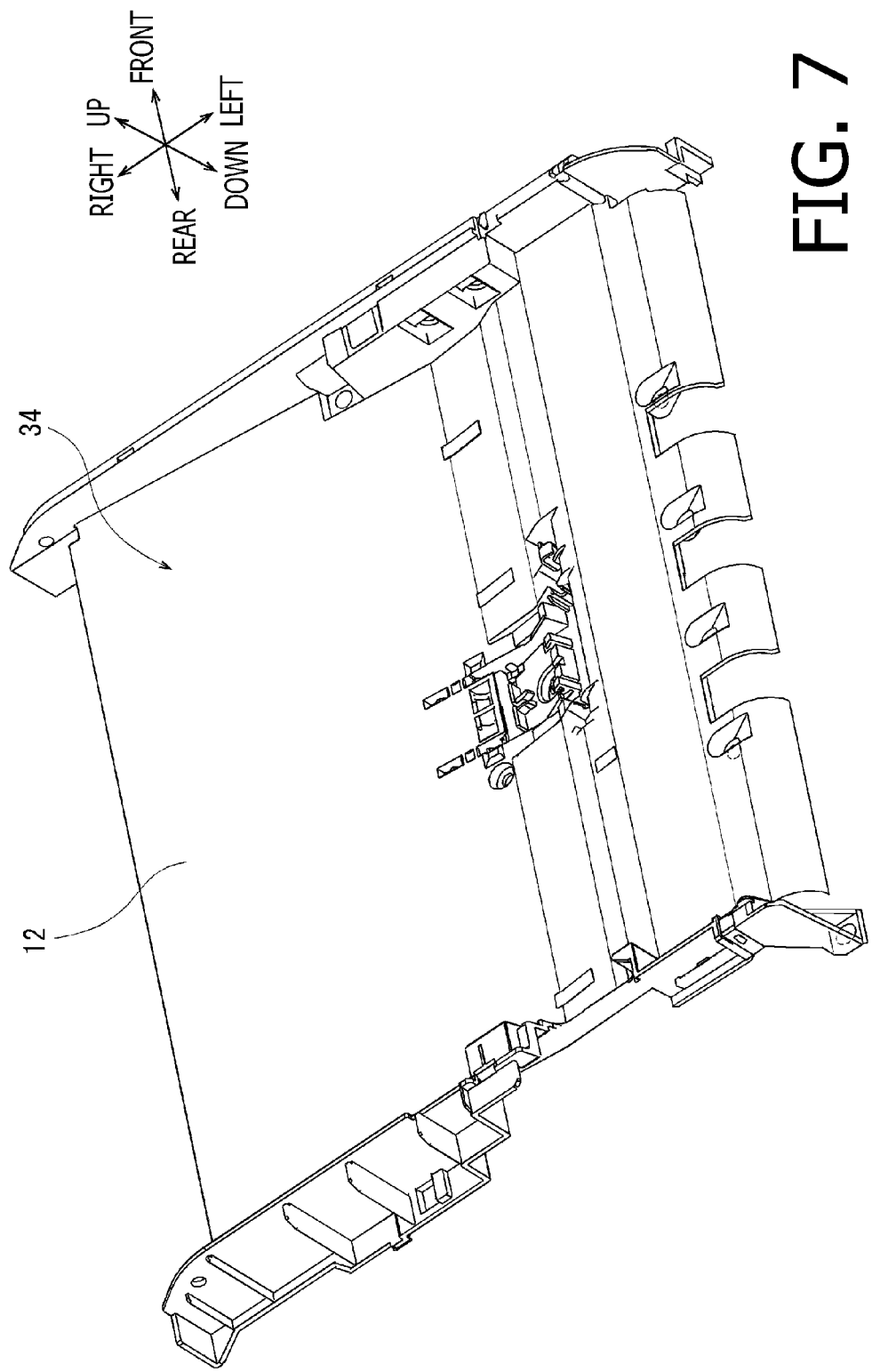

FIG. 7 is a perspective view of the upper chute 34 in the image reading apparatus 10 according to the embodiment of the present invention.

Figure 8:
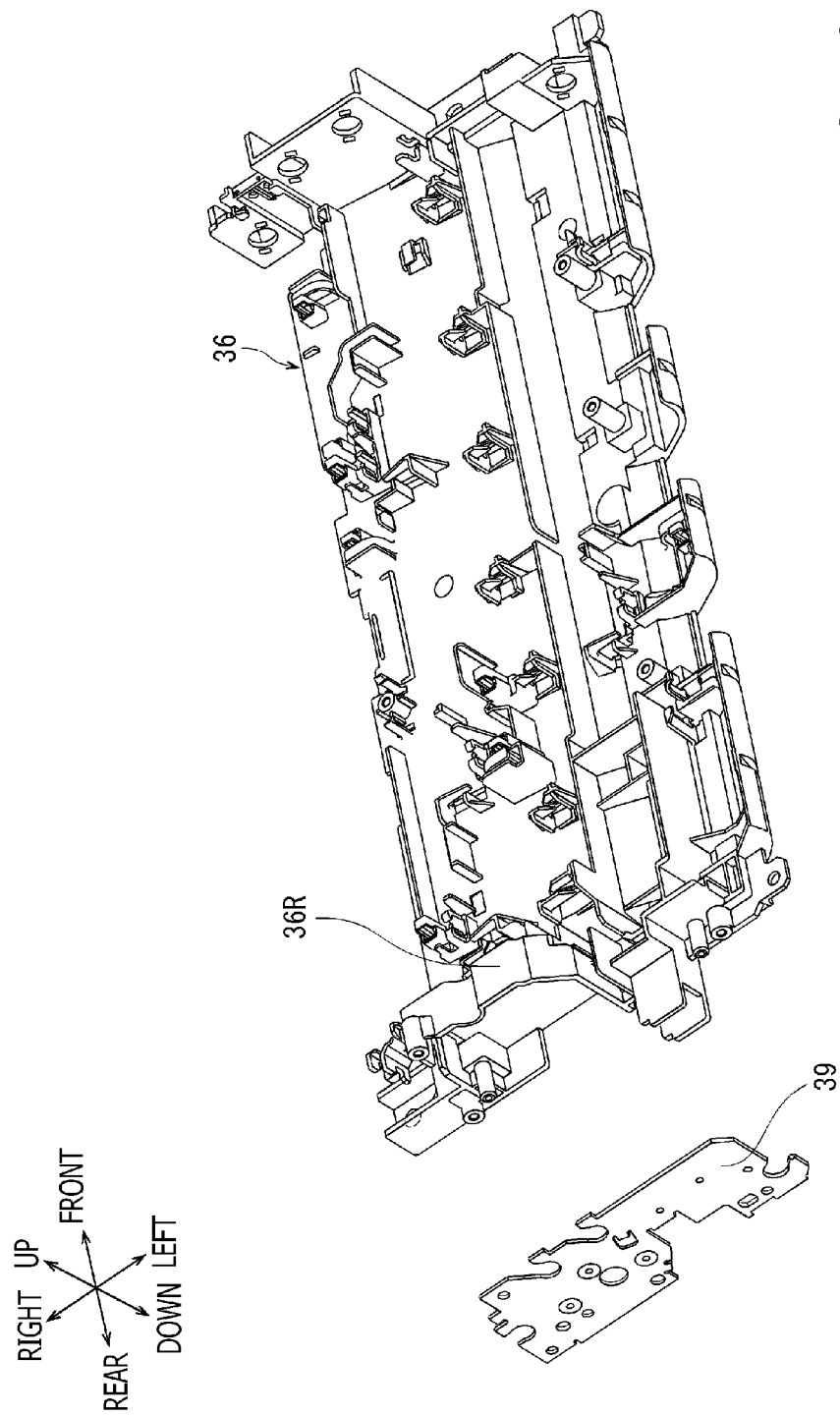

FIG. 8 is a perspective view of a lower chute 36 and a metal piece 39 in the image reading apparatus 10 according to the embodiment of the present invention.

Figure 9:
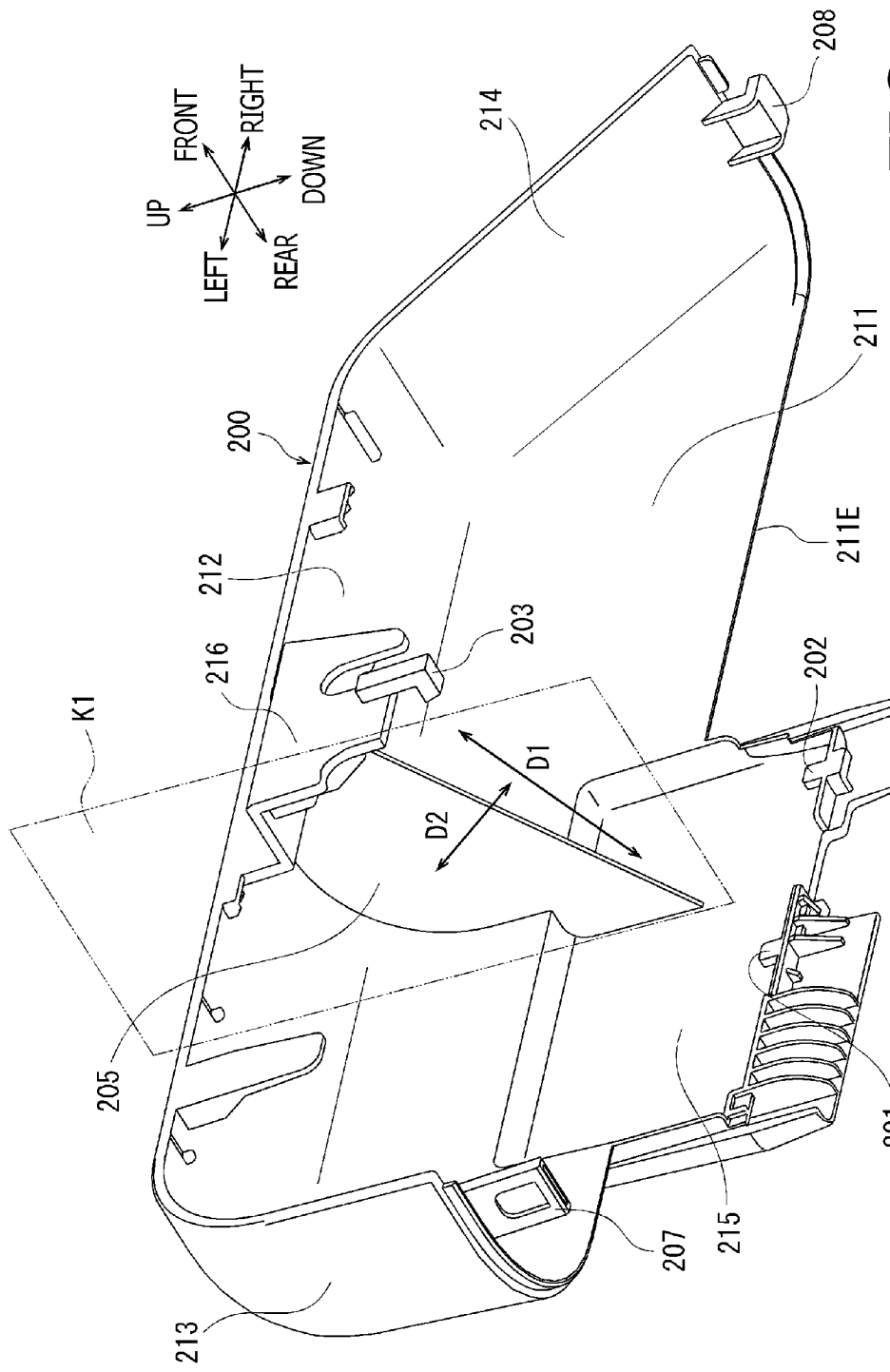

FIG. 9 is a perspective view of the rear cover 200 showing an inner side thereof in the image reading apparatus 10 according to the embodiment of the present invention.

Figure 10:
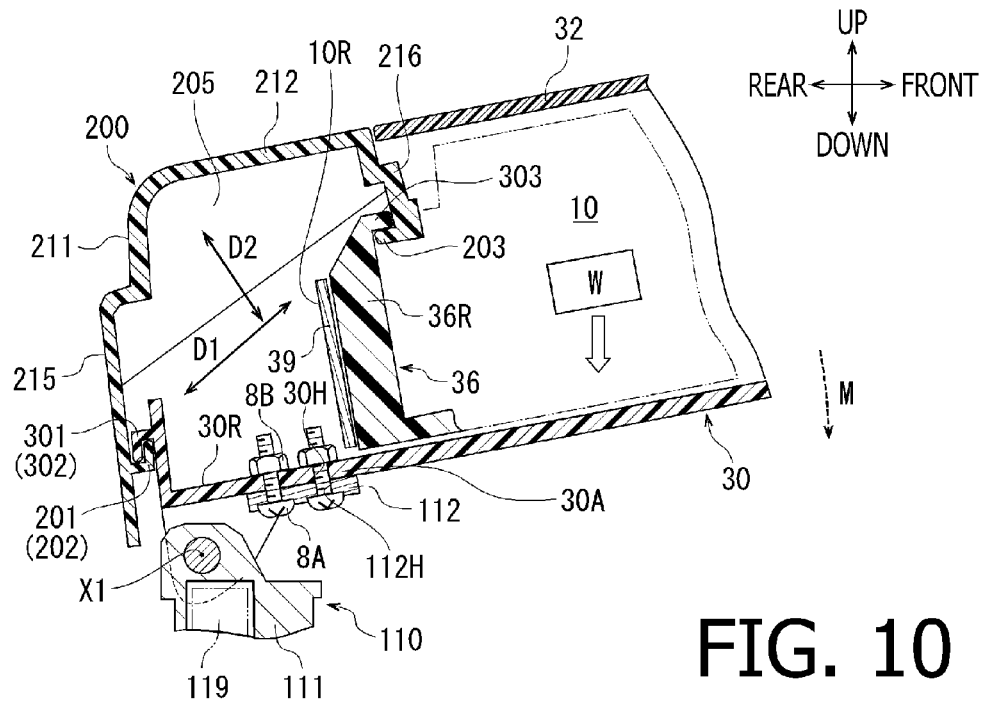

FIG. 10 is a cross-sectional partial view of the rear cover 200 with a coupling structure in the image reading apparatus 10 according to the embodiment of the present invention.

Figure 11:
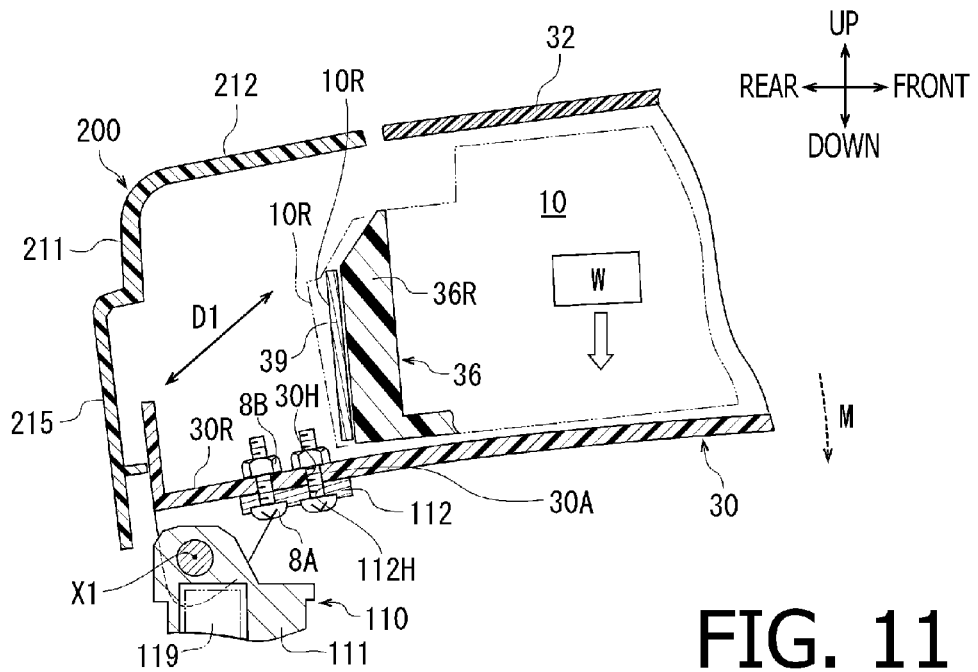

FIG. 11 is an exemplary cross-sectional partial view of a rear cover without the coupling structure in an image reading apparatus.

DETAILED DESCRIPTION

Figure 1:
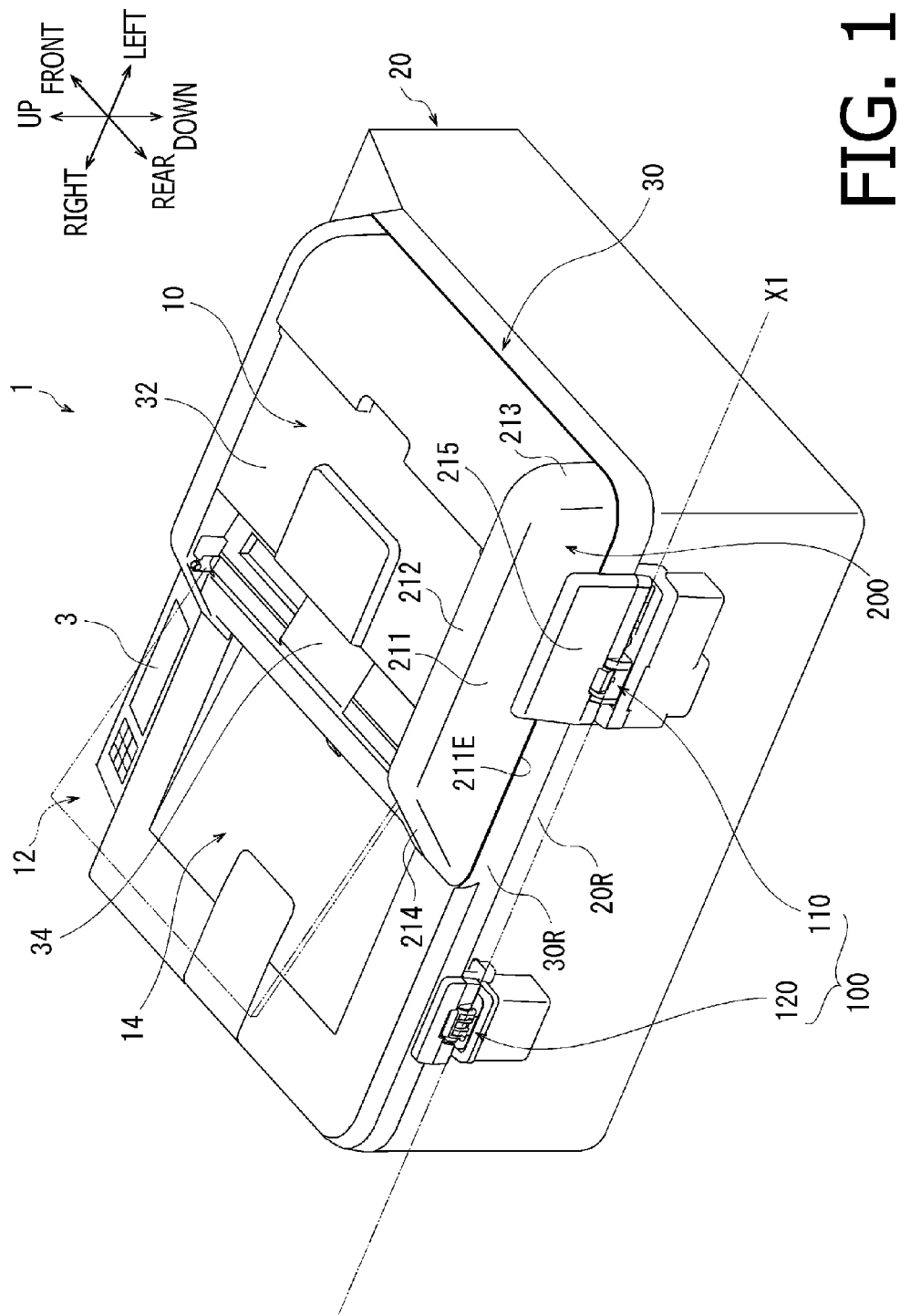
FIG. 1 is a perspective view of an image reading apparatus 10 showing a rear face according to an embodiment of the present invention.

Hereinafter, the image reading apparatus 10 according to the embodiment of the present invention will be described with reference to the accompanying drawings. In the description below, directions concerning the image reading apparatus 10 will be referred to based on a user's position to ordinarily use the image reading apparatus 10 while it is assumed that the user faces a front face of the image reading apparatus 10. That is, a viewer's upper right-hand side appearing in FIG. 1 is referred to as the user's front to use the image reading apparatus 10, and a lower left-hand side in FIG. 1 opposite from the front side is referred to as rear, while the image reading apparatus 10 has an operation panel 3 on the front side thereof. A side which corresponds to the viewer's lower right-hand side is referred to as left, and an opposite side from the left, which corresponds to the viewer's upper left-hand side, is referred to as the user's right. The up-and-down direction in FIG. 1 corresponds to a vertical direction of the image reading apparatus 10. Further, the vertical direction of the image reading apparatus 10 may be referred to as a direction of height, the user's right-to-left or left-to-right direction may be referred to as a widthwise direction, and the user's front-to-rear or rear-to-front direction may be referred to as a direction of depth. The direction of height, the widthwise direction, and the direction of depth are orthogonal to one another. In the following description, the terms representing the directions such as "horizontal" and "vertical" include directions "substantially horizontal" and "substantially vertical" respectively.

Overall Configuration of the Image Reading Apparatus

The image reading apparatus 10 according to the present embodiment includes a main unit 20, a document cover 30, and a conveyer unit 10. The conveyer unit 10 is an auto-document feeder (ADF), which conveys a sheet 9 of original document to be read along a sheet path. A rear cover 200 to cover a rear side of the conveyer unit 10 is disposed in an intermediate position between the document cover 30 and the conveyer unit 10. The rear cover 20 will be described later in detail with reference to FIGS. 6 and 9-11.

Figure 2:
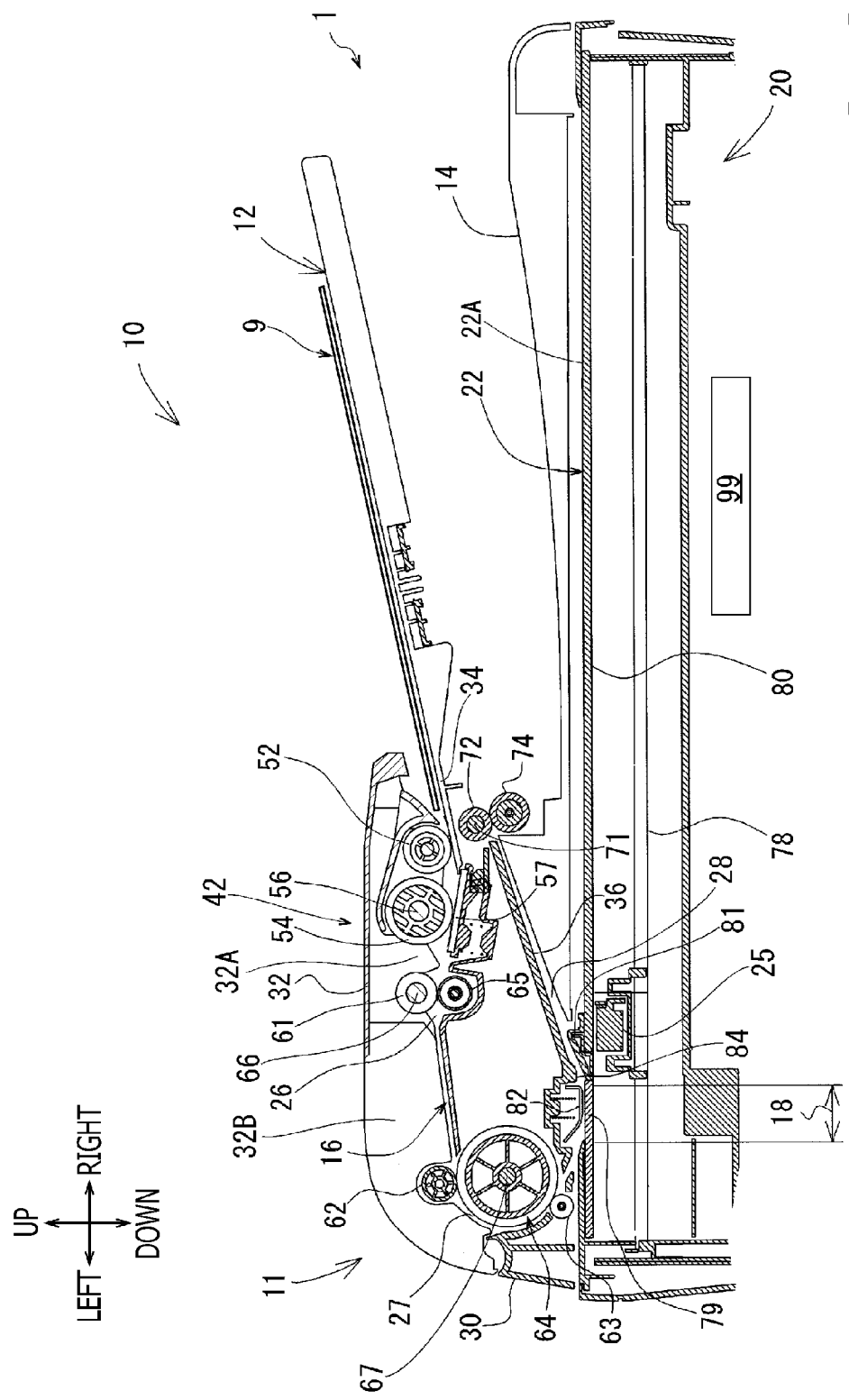
FIG. 2 is a cross-sectional side view of an upper part of the image reading apparatus 10 according to the embodiment of the present invention.

As shown in FIGS. 1 and 2, the main unit 20 includes the operation panel 3, a contact glass 22, and an image reader 25.

The operation panel 3 is disposed on the front side of the main unit 20. The operation panel 3 provides an interface with the user and accepts the user's instructions concerning operations in the image reading apparatus 10, such as image reading processes and parameter settings. The operation panel 3 includes a display (unsigned), which displays information concerning the operations executed in the image reading apparatus 10.

As shown in FIG. 2, the contact glass 22 is disposed in an upper position of the main unit 20. The contact glass 22 is a piece of flat glass, which spreads along the widthwise direction and along the direction of depth. The contact glass 22 includes a placement plane 22A, on which the original document to be read is placed.

The contact glass 22 includes a flatbed glass 80 and an ADF glass 79. The flatbed glass 80 and the ADF glass 79 align side-by-side on a same horizontal plane, and the ADF glass 79 is arranged in a leftward adjacent position with respect to the flatbed glass 80. The flatbed glass 80 is formed to have a rectangular shape, which has a substantial size to include various sizes of original sheets and books. The ADF glass 79 is formed to have a linearly elongated rectangular shape, which extends along the direction of depth of the image reading apparatus 10. In a position between the flatbed glass 80 and the ADF glass 79, a sheet separator 81 is disposed. A horizontal upward plane of the flatbed glass 80 serves as the placement plane 22A, on which the original sheet or pages of a book to be read is placed.

The image reader 25 is disposed in a lower position with respect to the contact glass 22 in the main unit 20. The image reader 25 includes a known image reader sensor, such as a contact image sensor (CIS) and a charge coupled device (CCD). In the present embodiment, the image reader 25 is equipped with a CIS.

The main unit 20 includes a slider shaft 78, which extends along the widthwise direction of the image reading apparatus 10, inside a chassis of the main unit 20. The image reader 25 is slidably supported on the slider shaft 78. When the image reading apparatus 10 is standing by for a reading operation, the image reader 25 is located in a lower left-side end position with respect to the flatbed glass 80. The image reader 25 can be driven to move in the widthwise direction along the slider shaft 78 when a pulley-and-belt system (not shown) is activated by controlling signals from a controller 99 to read the image formed on the original sheet while the original sheet is placed on the flatbed glass 80. When the original sheet 9 is automatically conveyed by the conveyer unit 10 to be read, the image reader 25 is placed at a stop position 18 underneath the ADF glass 79 and maintained still thereat to read the image formed on the original sheet 9 being conveyed.

The main unit 20 accommodates the controller 99, which controls behaviors of components in the image reading apparatus 10, including the operation panel 3, the image reader 25, and the conveyer unit 10.

As shown in FIGS. 1-4, the document cover 30 is a resin-made tray-like covering arranged on top of the main unit 20 to cover the placement plane 22A. A left side part of a top section of the document cover 30 forms a second conveyer path 28. A left-side part in the top section of the document cover 30 serves as a sheet-ejection tray 14.

As shown in FIGS. 1 and 2, the conveyer unit 10 is arranged in the top section of the document cover 30. The conveyer unit 10 includes the sheet-feed tray 12, in which one or more sheets 9 of original document to be read are set, and the sheet-ejection tray 14, in which the sheets having been read are ejected. The sheet-ejection tray 14 is formed on the right-hand side of the top part of the document cover 30. The sheet-feed tray 12 is arranged in an upper and separated position from the sheet-ejection tray 14.

The conveyer unit 10 includes, as shown in FIGS. 2 and 6, a sheet conveyer 42. The sheet conveyer 42 picks up the sheet 9 of original document separately from a plurality of sheets 9 set in the sheet-feed tray 12 and conveys the picked-up sheet 9 along a sheet path 16 to the sheet-ejection tray 14. As shown in FIGS. 1 and 2, the image reading apparatus 10 in the present embodiment has the sheet conveyer 42 with substantial weight arranged in an eccentric position closer to an left-side edge of the document cover 30 with respect to a widthwise center of the document cover 30. The weight of the sheet conveyer 42 is borne by the document cover 30.

As shown in FIGS. 1 and 3-6, the document cover 30 is swingably supported by the main unit 20 via a hinge 100 to be swingable about a swing axis X1, which extends in parallel with the widthwise direction of the image reading apparatus 10.

The hinge 100 includes a main hinge 110 and an auxiliary hinge 120. The main hinge 110 is arranged in a left-side rear position on the rear side of the main unit 20 and the document cover 30. On the other hand, the auxiliary hinge 120 is arranged in a right-side position on the rear side of the main unit 20 and the document cover 30.

As shown in FIGS. 4 and 5, the main hinge 110 includes an in-main-unit joint section 111 and on-cover joint section 112. The in-main-unit joint section 111 is formed to have a shape of prism extending vertically. The on-cover joint section 112 includes a flat plate, which extends frontward and is swingable with respect to the in-main-unit joint section 111 about the swing axis X1. The on-cover joint section 112 is formed to have a plurality of attachment holes 112H in the flat plate.

As shown in FIG. 3, the auxiliary hinge 120 includes an in-main-unit joint section 121 and on-cover joint section 122. The in-main-unit joint section 121 is formed to have a shape of prism extending vertically. The on-cover joint section 122 includes a flat plate, which extends frontward and is swingable with respect to the in-main-unit joint section 121 about the swing axis X1. The on-cover joint section 122 is formed to have a plurality of attachment holes 122H in the flat plate. The auxiliary hinge 120 is arranged in a rightward position with respect to the main hinge 110.

As shown in FIGS. 3 and 5, a pair of guide pits 20A are formed along a rear end 20R of the main unit 20. The rear end 20R includes an area approximate to a rear face of the main unit 20. The guide pits 20A are bottomed holes, which are formed downwardly from the top plane of the main unit 20, and align along the rear end 20R. The in-main-unit joint section 111 extending downward is inserted in one of the guide pits 20A on the left-hand side to be vertically movable in the guide pit 20A. Therefore, the main hinge 110 is attached to the rear end 20R of the main unit 20 and is still vertically movable with respect to the main unit 20.

The other of the guide pits 20A, in which the in-main-unit joint section 121 of the auxiliary hinge 120 is inserted, is formed on a rightward position along the rear end 20R of the main unit 20 (i.e., a farther side in FIG. 5) with respect to the guide pit 20A, in which the main hinge 110 is inserted. Similarly to the main hinge 110, the in-main-unit joint section 121 extending downward is inserted in the guide pits 20A on the right-hand side to be vertically movable in the guide pit 20A. Therefore, the auxiliary hinge 120 is attached to the rear end 20R of the main unit 20 and is still vertically movable with respect to the main unit 20.

As shown in FIGS. 3 and 4, a rear end 30R of the document cover 30 includes a pair of attachable portions 30A aligning along the widthwise direction. The rear end 30R of the document cover 30 includes an area approximate to a rear face of the document cover 30. One of the attachable portions 30A on the left-hand side includes a plurality of attachable holes 30H, which are formed at the leftward positions to penetrate a bottom plane of the rear end 30R of the document cover 30. The other of the attachable portions 30A on the right-hand side includes a plurality of attachable holes 30H, which are formed at the rightward positions to penetrate a bottom plane of the rear end 30R of the document cover 30.

As shown in FIGS. 4 and 5, with the attachable holes 30H in the document cover 30 and the attachment holes 112H in the on-cover joint section 112 of the main hinge 110 aligned to coincide with each other respectively, bolt screws 8A are inserted in the attachable holes 30A and the attachment holes 112H and fixed thereat by nuts 8B. Thereby, the on-cover joint section 112 of the main hinge 110 is fixed to the attachable portion 30A on the left-hand side of the rear end 30R.

Similarly, with the attachable holes 30H in the document cover 30 and the attachment holes 122H in the on-cover joint section 122 of the auxiliary hinge 120 aligned to coincide with each other respectively, bolt screws 8A are inserted in the attachable holes 30A and the attachment holes 122H and fixed thereat by nuts 8B. Thereby, the on-cover joint section 122 of the auxiliary hinge 120 is fixed to the attachable portion 30A on the right-hand side of the rear end 30R (see FIG. 3).

The main hinge 110 is a known self-locking hinge, which includes an urging member 119. The urging member 119 is arranged in an intermediate position between the in-main-unit joint section 111 and the on-cover joint section 112. The urging member 119 provides expanding force to swingably open the on-cover joint section 112 with respect to the in-main-unit joint section 111 about the swing axis X1 in a counterclockwise direction in FIG. 5. The urging member 119 can break the swing motion of the on-cover joint section 112 with respect to the in-main-unit joint section 111 to hold the on-cover joint section 112 in a desired open posture.

Meanwhile, the auxiliary hinge 120 is not equipped with the urging member. Therefore, a quantity of parts in the image reading apparatus 10 can be reduced.

With the main hinge 110 and the auxiliary hinge 120, the document cover 30 is swingable about the swing axis X1 and movable between an open position to expose the contact glass 22 and a closed position to cover the contact glass 22. The document cover 30 in the closed position is drawn in FIG. 1. When the user uplifts a front end of the document cover 30, the document cover 30 swings about the swing axis X1, and the contact glass 22 of the main unit 20 is exposed. In the present embodiment, an uplifted position of the document cover 30 exposing the contact glass 22 is referred to as the open position as long as the contact glass 22 is exposed.

When the user presses the front end of the document cover 30 in the open position downwardly, the document cover 30 swings about the swing axis X1 in a reverse direction and returns to the closed position. In this regard, when the original document with substantial thickness is placed on the placement plane 22A, the main hinge 110 and the auxiliary hinge 120 are uplifted with respect to the guide pits 20A in the main unit 20 according to the thickness of the original document. Thus, the document cover 30 is moved vertically with respect to the main unit 20 and displaced to be in an orientation in parallel with the placement plane 22A of the main unit 20 with the original document intervening in there-between.

When the user uplifts and presses down the document cover 30, the urging member 119 in the main hinge 110 generates expanding force to hold the weight of the document cover 30 and the conveyer unit 10 in the open position. Therefore, the user can swing the document cover 30 with smaller force. When the user stops the document cover 30 in a desired position, the urging member 119 in the main hinge 100 damps the displacing force of the on-cover joint section 112 with respect to the in-main-unit joint section 111 and holds the document cover 30 at the position. Therefore, the user can release the document cover 30 and easily set and remove the original document on and from the placement plane 22A without holding the document cover 30 by hand. In other words, the main hinge 100, which generates torque to affect the document cover 30 when the placement plane 22A is exposed, improves usability of the document cover 30.

Next, the conveyer unit 10 will be described in detail. As shown in FIG. 2, the conveyer unit 10 includes an upper chute 34, a lower chute 36, an upper cover 32, and the sheet conveyer 42, which are directly or indirectly attached to the document cover 30.

The upper chute 34 is a plate made of resin, which extends in an upper-rightward inclined orientation (see FIGS. 2, 3, and 7). A right-side part in a top surface of the upper chute 34 serves as the sheet-feed tray 12, and a left-side part of the upper chute 34 serves as a part of a first sheet path 26. The lower chute 36 is a plate made of resin, which extends in a range between a lower position with respect to a main roller 64 and a position in vicinity of an ejection roller 72, and serves as a part of the second sheet path 28 (see FIGS. 2 and 8). The upper cover 32 is a resin-made covering arranged over a left-side part of the document cover 30 and covers the left-side part of the upper chute 34 (see FIGS. 1 and 2).

As shown in FIG. 2, the sheet conveyer 42 is arranged in the eccentric position on the left-side part on the document cover 30 with respect to the widthwise center of the document cover 30. The sheet conveyer 42 picks up the sheet 9 of original document separately from a plurality of sheets 9 placed in the sheet-feed tray 12 and conveys the picked-up sheet 9 in the sheet path 16 to the ejection tray 14.

The sheet path 16 includes the first sheet path 26, a curved sheet path 27, and the second sheet path 28. The sheet 9 is conveyed in the sheet path 16 in a direction of sheet-conveying flow, which starts from the sheet-feed tray 12 and ends at the ejection tray 14. The first sheet path 26 in the sheet path 16 extends from the left-side end of the sheet-feed tray 12 to a position in vicinity of the main roller 64. The curved sheet path 27 extends continuously from the first sheet path 26 downwardly around a part of circumference of the main roller 64 in an arc. The second feed path 28 extends continuously from the curved sheet path 27 in an upper-rightward inclined orientation to the left-side end of the ejection tray 14.

The upper cover 32 in the document cover 30 is formed to have a plurality of enhancing ribs 32A, 32B on an inner (lower) side thereof. The enhancing ribs 32A, 32B protrude downwardly from an inner surface of the upper cover 32 and extend in a range between a right-side end of the upper cover 32 to a left-side end of the upper cover 32. The sheet 9 being conveyed from the sheet-feed tray 12 becomes in contact with lower edges of the enhancing ribs 32A, 23B by an upper surface thereof and guided in the first sheet path 26 and a part of the curved sheet path 27. In other words, the enhancing ribs 32A, 32B serve as a part of the first sheet path 26 and a part of the curved sheet path 27.

The main roller 64 is arranged in a lower position with respect to the left-side end of the enhancing ribs 32A, 23B and in an inner-side position with respect to the left-side end of the document cover 30. The inner left-side surface of the document cover 30, the left-side ends of the enhancing ribs 32A, 23B in the upper cover 32, and the outer circumference of the main roller 64 guide the sheet 9, which was conveyed through the first sheet path 26, toward the second sheet path 28. In other words, the inner left-side surface of the document cover 30, the left-side ends of the enhancing ribs 32A, 23B in the upper cover 32, and the outer circumference of the main roller 64 serve as the curved sheet path 27.

The inner left-side surface of the document cover 30 and the lower chute 36 guide the sheet 9 having been conveyed through the curved sheet path 27 and to be conveyed to the ejection tray 14. In other words, the inner surface of the document cover 30 and the lower chute 36 serve as the second sheet path 28.

The document cover 30 is formed to have a linearly elongated rectangular-shaped opening 84 in the second sheet path 28 in a vicinity of a boundary between the second sheet path 28 and the curved sheet path 27 (see FIGS. 2 and 6). When the document cover 30 is in the closed position, the linear opening 84 comes to a position above the ADF glass 79 and the image reader 25 being in the stop position 18. The sheet 9 being conveyed in the second sheet path 28 passes through the linear opening 84 over the ADF glass 79 in the main unit 20. In this regard, the sheet 9 passing through the linear opening 84 is exposed to the image reader 25 being at the stop position 18 to have the image appearing on the sheet 9 read. When the sheet 9 passing through the linear opening 84 returns in the second sheet path 28, a separator 81 arranged in a position between the ADF glass 79 and the flatbed glass 80 directs the sheet 9 to be separated from the ADF glass 79 and to return in the second sheet path 28.

The sheet conveyer 42 is arranged in an upper position with respect to the upper chute 34 and includes a first rotation shaft 56, a separator roller 54, a separator pad 57, and a pickup roller 52. The first rotation shaft 56 extends along the direction of depth of the image reading apparatus 10. The separator roller 54 is a roller fixed to a central area in an axial length of the rotation shaft 56 coaxially with the rotation shaft 56. The separator pad 57 is arranged in a lower position with respect to the separator roller 54. The pickup roller 52 is arranged in a rightward position with respect to the separator roller 54 and rotates in synchronization with the separator roller 54.

The first rotation shaft 56 is rotatably supported by a metal piece 39 (see FIGS. 3 and 8) at a rear end thereof, although an image of the first rotation shaft 56 is omitted in FIG. 3. The metal piece 39 is a press-formed plate, which is arranged in an outer position in adjacent to a rear wall 36R of the lower chute 36 to be attached to a part of the lower chute 36.

The first rotation shaft 56 is driven by driving force transmitted from a drive source 42M and a plurality of gears (unsigned), to rotate in a predetermined direction (e.g., clockwise in FIG. 2). The drive source 42M is arranged on a rear side of the metal piece 39.

As shown in FIG. 2, the pickup roller 52 is arranged in a position to become in contact with the sheets 9 set in the sheet-feed tray 12. As the pickup roller 52 rotates, the sheets 9 including a topmost sheet being in contact with the pickup roller 52 are picked up to be conveyed into the first sheet path 26. The separator roller 54 becomes in contact with the topmost sheet 9 being picked up by the pickup roller 52, and as the separator roller 54 rotates, the sheet 9 is further conveyed in the first sheet path 26. In this regard, the topmost sheet 9 is separated from the other sheets 9 by friction force caused between the separator roller 54 and the separator pad 57. Thus, the sheets 9 set in the sheet-feed tray 12 are picked up one-by-one from the top and conveyed in the first sheet path 26 to a downstream side (i.e., toward the ejection tray 14) of the sheet-conveying flow.

The sheet conveyer 42 further includes a second rotation shaft 66, a conveyer roller 61, a pinch roller 65, a third rotation shaft 67, the main roller 64, and pinch rollers 62, 63. The second rotation shaft 66 is arranged in a leftward position with respect to the separator roller 54 in the first sheet path 26, that is, in a downstream position with respect to the separator roller 54 along the sheet-conveying flow. The conveyer roller 61 is a roller coaxially fixed to the second rotation shaft 66. The pinch roller 65 is arranged in a position opposite from the conveyer roller 61 across the first sheet path 26. The third rotation shaft 67 is arranged in the curved sheet path 27, and the main roller 64 is coaxially fixed to the third rotation shaft 67. The pinch rollers 62, 63 are arranged in positions opposite from the main roller 64 across the curved sheet path 27.

The second rotation shaft 66 is rotatably supported by the metal piece 39 (see FIG. 3) at a rear end thereof, although an image the second rotation shaft 66 is omitted in FIG. 3. The second rotation shaft 66 is driven by the drive source 42M to rotate in the predetermined direction (e.g., clockwise in FIG. 2) integrally with the conveyer roller 66. Accordingly, the sheet 9 being conveyed by the separator roller 54 is nipped by the conveyer roller 61 and the pinch roller 65 to be further conveyed in the curved sheet path 27.

The third rotation shaft 67 is rotatably supported by the metal piece 39 (see FIG. 3) at a rear end thereof, although an image the third rotation shaft 67 is omitted in FIG. 3. The third rotation shaft 67 is driven by the drive source 42M to rotate in a predetermined direction (e.g., counterclockwise in FIG. 2) integrally with the main roller 67. Accordingly, the sheet 9 being conveyed by the conveyer roller 61 is nipped by the main roller 64 and the pinch rollers 62, 63 to be further conveyed in the second sheet path 28.

The sheet conveyer 42 further includes a fourth rotation shaft 71, an ejection roller 72, and a pinch roller 74. The fourth rotation shaft 71 is arranged in a vicinity of a rightmost section of the lower chute 36, that is, at a most downstream position along the sheet-conveying flow in the second sheet path 28. The ejection roller 72 is coaxially fixed to the fourth rotation shaft 71, and the pinch roller 74 is arranged in a position opposite from the ejection roller 72 across the second sheet path 28.

The fourth rotation shaft 71 is rotatably supported by the metal piece 39 (see FIG. 3) at a rear end thereof, although an image the fourth rotation shaft 71 is omitted from FIG. 3. The fourth rotation shaft 71 is driven by the drive source 42M to rotate in a predetermined direction (e.g., counterclockwise in FIG. 2) integrally with the ejection roller 72. Accordingly, the sheet 9 being conveyed in the second sheet path 28 is nipped by the ejection roller 72 and the pinch roller 74 to be released in the discharge tray 14.

Further, the document cover 30 includes a presser piece 82, in a position opposite from the image reader 25 being at the stop position 18 across the ADF glass 79. The presser piece 82 is attached to a lower plane of the lower chute 36 via an expanding coil spring (unsigned), which urges the presser piece 82 downwardly. The sheet 9 being conveyed in the second sheet path 28 is pressed toward the image reader 25 by the presser piece 82 while being read by the image reader 25.

Reading Behaviors of the Image Reader

When the user places an original sheet or an open book on the placement plane 22A to have an image appearing on the original sheet or on the open page of the book read by the image reader 25, an auto-feeding function of the conveyer unit 10 is not used. Therefore, the image reader 25 is manipulated by the controller 99 to move from the leftward end position to the rightward end position of the placement plane 22A underneath the contact glass 22 and reads the image from the original sheet or the open page of the book while being moved. Thereafter, output signals for image data representing the read image are transmitted to the controller 99.

Auto-Reading Behaviors with the Conveyer Unit

Behaviors of the conveyer unit 10 in the document cover 30 in an auto-reading operation to automatically read images from the sheet 9 being conveyed in the sheet path 16 will be described. When the user sets at least one sheet 9 of original document in the sheet-feed tray 12 (see FIG. 2) to have images appearing on the sheet 9 read by the image reader 25, the auto-feeding function of the conveyer unit 10 is used. Therefore, the image reader 25 is manipulated by the controller 99 to move to the stop position 18 below the ADF glass 79. When a plurality of sheets 9 are set in the sheet-feed tray 12, the sheets 9 in the sheet-feed tray 12 are picked up one-by-one by the sheet conveyer 42 and conveyed separately in the first sheet path 26 and to the curved sheet path 27. When the separated sheet 9 is conveyed in the curved sheet path 27, the sheet 9 is reversed to have a lower side upward and an upper side downward. When the sheet 9 passes over the image reader 25 being at the stop position 18, the image appearing on the current lower side is read by the image reader 25. The sheet 9 is further conveyed in the second sheet path 28 and released in the discharge tray 14. If the user sets a plurality of sheets 9 of original document in the sheet-feed tray 12, the above-described behaviors of the conveyer unit 10 are repeated automatically until a last sheet 9 in the sheet stack is ejected in the ejection tray 14.

Rear Cover Functioning as a Joint

As shown in FIGS. 1, 6, and 9, the rear cover 200 is a resin-made single piece having a rear wall 211, an upper wall 212, a left wall 213, a right wall 214, and a main hinge cover 215.

The rear wall 211 is formed to spread along the widthwise direction and along the vertical direction. The rear wall 211 covers the drive source 42M, the metal piece 39, and the rear wall 36R of the lower chute 36 from the rear side. As shown in FIG. 1, a lower edge 211E of the rear wall 211 is in contact with an upper edge of the rear end 30R of the document cover 30.

The upper wall 212, the left wall 213, and the right wall 214 are formed to extend frontward from an upper end, a left-side end, and a right-side end of the rear wall 211 respectively. Front ends of the upper wall 212, the left wall 213, and the right wall 214 are respectively in contact with a rear end of the upper cover 32.

As shown in FIG. 9, the rear cover 200 is formed to have engagement parts 207, 208, which protrude downward, at a lower edge of the left wall 213 and a lower edge of the right wall 214 respectively. The engagement parts 207, 208 are engageable with mating engageable parts (not shown), which are formed in the rear end 30R of the document cover 30, and when the engagement parts 207, 208 are engaged with the mating engageable parts of the document cover 30, the rear cover 200 is attached to the rear end 30R of the document cover 30.

As shown in FIGS. 1 and 9, the main hinge cover 215 is formed to protrude rearward from an upper position of the main hinge 110 at the rear wall 211 and to extend downward to cover the on-cover joint section 112 partially.

As shown in FIGS. 9 and 10, the main hinge cover 215 is formed to have hooks 201, 202 at lower positions on an inner side thereof. The hooks 201, 202 are formed to have a same height. As shown in FIG. 10, the hooks 201, 202 are formed to have a cross-sectional shape of an upward claw, which protrudes frontward from the main hinge cover 215 and bends upward at a right angle, when viewed along the widthwise direction.

As shown in FIGS. 9 and 10, the main hinge cover 200 is formed to have a crank part 216, which protrudes frontward and downward in a shape of a crank, at a widthwise center on a front end of the upper wall 212. Further, the crank part 216 is formed to have a hook 203 at a lower end thereof. The hook 203 protrudes in a shape of a prism downward from a lower end of the crank part 216 and bends rearward at a right angle, when viewed along the widthwise direction.

As shown in FIGS. 4 and 10, the document cover 30 is formed to have engageable parts 301, 302, at the rear end 30R on a rearward plane in upper positions with respect to the main hinge 110. The engageable parts 301, 302 are formed to have a same height. As shown in FIG. 10, the engageable parts 301, 302 are formed to have a cross-sectional shape of a downward claw, which protrudes rearward from the rearward plane of the rear end 30R of the document cover 30 and bends downward at a right angle, when viewed along the widthwise direction.

As shown in FIG. 10, at the rear end 10R of the conveyer unit 10, the metal piece 39 and the rear wall 36R of the lower chute 36 are placed. On an upper end of the rear wall 36R, an engageable part 303, which protrudes frontward in a shape of a claw, is formed.

With the hooks 201, 202 in the rear cover 200 and the engageable parts 301, 302 in the document cover 30, when the rear cover 200 is fixed to the rear end 30R of the document cover 30, the hook 201 is engaged with the engageable part 301 to hold the engageable part 301 from the lower and rear sides, and the hook 202 is engaged with the engageable part 302 to hold the engageable part 302 from the lower and rear sides. Meanwhile, the hook 203 is engaged with the engageable part 303 to hold the engageable part 303 from the lower and front sides. Thus, the rear cover 200 is coupled to the document cover 30 to hold the engagement parts 301, 302 at the rear end 30R and the engageable part 303 at the rear end 10R of the conveyer unit 10 together so that the engagement parts 301, 302 and the engageable part 303 are restricted from being separated from each other along an orthogonal direction D1 (see FIG. 10), which is orthogonal with respect to the widthwise direction. In other words, the orthogonal direction D1 is a mutually attracting direction for the engageable parts 301, 302 at the rear end 30R of the document cover 30 and the engageable part 303 at the rear end 10R of the conveyer unit 10 to pull each other.

As shown in FIGS. 9 and 10, the rear cover 200 is formed to have a rib 205 along a frontward plane of the rear wall 211 and a downward plane of the upper wall 212. The rib 205 extends from an upper position with respect to the hooks 201, 202 along the orthogonal direction D1 to reach an upper position with respect to the hook 203. As shown in FIG. 9, the rib 205 is formed to also extend along a spreading direction D2, which intersects with the orthogonal direction D1 orthogonally on a virtual plane K1, to approximate the rear end 30R of the document cover 30 and the rear end 10R of the conveyer unit 10. The virtual plane K1 intersects with the widthwise direction orthogonally.

Effects

In the image reading apparatus 1 described above, the on-cover joint section 111 in the main hinge 100 is attached to the rear end 30R of the document cover 30, and an L-shaped metal frame to be fixed to the rear end 30R along with the on-cover joint section 111 is omitted. In place of the L-shaped metal frame, the metal piece 39 being a flat metal piece is employed to hold the sheet conveyer 42. With the replacement of the L-shaped metal frame, manufacturing cost for the image reading apparatus 1 may be reduced.

In the image reading apparatus 1 with the metal piece 39 in place of the L-shaped metal frame, if no additional modification is made, the torque produced by the urging member 119 in the main hinge 110 affects the document cover 30 when the document cover 30 is in the open posture, and the document cover 30 may be deformed to be bent downwardly at a front end thereof. FIG. 11 shows an example of the image reading apparatus, in which the L-shaped metal frame is omitted, and no modification, such as the hooks 201, 202, 203, the crank part 216, the rib 205, and the engageable parts 301, 302, 303, is added. In the image reading apparatus shown in FIG. 11, when the document cover 30 is in the open posture, due to weight W of the conveyer unit 10, moment M is generated in the document cover 30. Therefore, the document cover 30 is deformed to be bent downwardly at the front end thereof. Accordingly, reaction force may concentrate in an area around the rear end 30R of the document cover 30, in particular, in the attachable portion 30A of the document cover 30. As a result, the concentrated force, when the document cover 30 is repeatedly opened and closed over a long period of time, the document cover 30 may be exhausted or damaged at the area around the attachable portion 30A.

When the document cover 30 is deformed to be bent downwardly at the front end thereof, the rear end 10R of the conveyer unit 10 tends to be displaced from a position indicated by a double-dotted chain line shown in FIG. 11 to the position indicated by the solid line shown in FIG. 11. In this respect, the rear end 30R of the document cover 30 and the rear end 10R of the conveyer unit 10 are separated from each other along the orthogonal direction D1. Thus, the downward deformation of the document cover 30 at the front end thereof is associated with the separation of the rear end 30R of the document cover 30 and the rear end 10R of the conveyer unit 10 along the orthogonal direction D1.

According to the image reading apparatus 1 described above, on the other hand, the rear cover 200 coupling the document cover 30 and the conveyer unit 10 together is arranged in the intermediate position between the document cover 30 and the conveyer unit 10. The rear cover 200 couples the engageable parts 301, 302 at the rear end 30R of the document cover 30 and the engageable part 303 at the rear end 10R of the conveyer unit 10 together so that the engagement parts 301, 302 and the engageable part 303 are restricted from being separated from each other along the orthogonal direction D1. Further, the rear cover 200 is enhanced by the rib 205. Therefore, the rear cover 200 is enhanced to couple the engageable parts 301, 302 and the engageable part 303 to each other even more securely so that the engagement parts 301, 302 and the engageable part 303 are restricted from being separated from each other along the orthogonal direction D1.

Meanwhile, the downward deformation of the document cover 30 at the front end thereof is associated with the separation of the rear end 30R of the document cover 30 and the rear end 10R of the conveyer unit 10 along the orthogonal direction D1. However, the rear cover 200 prevents the rear end 30R of the document cover 30 and the rear end 10R of the conveyer unit 10 from being separated from each other along the orthogonal direction D1. In other words, with the rear cover 200 coupling the document cover 30 and the conveyer unit 10 to each other, the conveyer unit 10, the document cover 30, and the rear cover 200 constitute a single weight.

Accordingly, even with the moment M, the document cover 30 may be prevented from being deformed at the front end thereof. Therefore, concentration of the reaction force in the area around the rear end 30R of the document cover 30, in particular, in the attachable portion 30A of the document cover 30, may be reduced or prevented. As a result, even when the document cover 30 is repeatedly opened and closed over a long period of time, the document cover 30 may be prevented from being exhausted or damaged at the region around the attachable portion 30A.

Thus, with the image reading apparatus 1 according to the embodiment described above, manufacturing cost may be lowered, and durability of the document cover 30 may be improved.

In the image reading apparatus 1 according to the embodiment, the rear end 30R of the document cover 30 and the rear end 1 OR of the conveyer unit 10 are coupled to each other in the less complicated structure easily by the hooks 201, 202, 203, which are formed in the rear cover 200.

In the image reading apparatus 1 according to the embodiment, the rear cover 200 serves as a coupling device to couple the document cover 30 and the rear end 10R of the conveyer unit 10 together and as an external covering to enclose the conveyer unit 10. Therefore, in the image reading apparatus 1, a quantity of parts to be used can be reduced, compared to an image reading apparatus, in which the coupling device and the external covering are separately prepared. Therefore, the manufacturing cost may be lowered even more efficiently.

In the image reading apparatus 1 according to the embodiment, the auxiliary hinge 120 is not equipped with the urging member 119. Therefore, the quantity of the parts in the image reading apparatus 1 may be reduced, and the manufacturing cost may be lowered effectively. Without the urging member 119 in the auxiliary hinge 120, and with the urging member 119 in the main hinge 110, if the rear cover 200 is not provided, the document cover 30 may tend to be unevenly twisted around the swing axis X1. In such a configuration, concentration of the reaction force may be caused in the document cover 30, and durability of the document cover 30 may be lowered. However, with the rear cover 200 in the image reading apparatus 1 according to the embodiment described above, which couples the document cover 30 and the conveyer unit 10 together, the conveyer unit 10, the document cover 30, and the rear cover 200 constitute a single weight. Therefore, durability of the document cover 30 may be improved.

Although an example of carrying out the invention has been described, those skilled in the art will appreciate that there are numerous variations and permutations of the image reading apparatus that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the rear end 30R of the document cover 30 and the rear end 10R of the conveyer unit 10 may be prevented from being separated from each other along the orthogonal direction D1 by a rod or a contracting spring.

For another example, the hooks 201, 202, 203 may be replaced with fastening devices, such as screws.

What is claimed is:

1. An image reading apparatus, comprising:
   a main unit comprising a placement plane, the placement plane configured to receive placement of a document sheet to be read, and an image reader configured to read an image formed on the document sheet placed on the placement plane;
   a document cover made of resin and configured to be swingably supported by the main unit via a hinge to swing about a swing axis, the swing axis being parallel to a first direction, and being movable between a closed position to cover the placement plane and an open position to expose the placement plane, the document cover having a first engageable part; and
   a conveyer unit arranged on the document cover, the conveyer unit comprising a document tray, the document tray configured to accommodate the document sheet to be read therein, the conveyer unit being configured to convey the document sheet from the document tray to have the image formed thereon read by the image reader the conveyer unit have a second engageable part,
   wherein the hinge comprises:
   an in-main-unit joint section, which is configured to be attached to an end of the main unit on one side along a third direction being orthogonal to the first direction and to a second direction, the second direction being orthogonal to a plane of a lower surface of the document cover which faces the placement plane at the closed position; and
   an on-cover joint section, which is configured to be attached to a joint attachment part provided on an end of the document cover on the one side along the third direction;
   wherein a coupling device, configured to couple the end of the document cover on the one side along the third direction with an end of the conveyer unit on the one side along the third direction, and to restrict the end of the document cover and the end of the conveyer unit from being separated from each other along the third direction, is disposed in an intermediate position between the document cover and the conveyer unit, the coupling device comprising:
   an upper wall configured to form at least a portion of an outer cover of the image reading apparatus;
   a first wall extending substantially in the second direction from one end of the upper wall, the first wall comprising a first engagement part configured to engage with the first engageable part;
   a second wall extending substantially in the second direction from another end of the upper wall, the second wall comprising a second engagement part to engage with the second engageable part; and
   a rib extending substantially in the second direction from the upper wall, a distal end of the rib in the second direction comprising a lower edge, the lower edge extending substantially in the third direction and coupling the first and second walls in the third direction, wherein the rib varies in width in a direction orthogonal to the lower edge of the distal end of the rib along the third direction from the first wall to the second wall, in a manner such that the rib provides more rigidity to the coupling device as compared to a case in which the rib does not vary in width in the direction orthogonal to the lower edge of the distal end of the rib along the third direction from the first wall to the second wall;
   wherein a portion of the end of the document cover in the third direction extends beyond an attachable portion configured to attach to the on-cover joint section of the hinge,
   wherein the first engagement part is configured to engage with the portion of the end of the document cover in the third direction, wherein the portion of the end of the document cover comprises the first engageable part, and the second engagement part is configured to engage with the end of the conveyer unit in the third direction, wherein the end of the conveyer unit comprises the second engageable part, and wherein the rib is a reinforcing member configured to prevent movement of the first engageable part and second engageable part away from one another in the third direction.

2. The image reading apparatus according to claim 1, wherein the rib of the coupling device extends along an orthogonal direction and along a spreading direction, the spreading direction intersecting with the third direction orthogonally on a virtual plane, which intersects with the first direction orthogonally.

3. The image reading apparatus according to claim 1, wherein the first engageable part is a first hooked engageable part, and wherein the first engagement part is a second hooked engagement part configured to engage with the first engageable part.

4. The image reading apparatus according to claim 1, wherein each of the first and second engagement parts is configured to be coupled to the first engageable part and second engageable part, respectively, via at least one screw.

5. The image reading apparatus according to claim 1, wherein the coupling device is configured to cover the conveyer unit.

6. The image reading apparatus according to claim 1, wherein the hinge comprises a main hinge and an auxiliary hinge, and wherein the document cover is swingably supported by the main unit via the main hinge and the auxiliary hinge to be swingable about the swing axis.

* * * * *